United States Patent [19]

Jellinek et al.

[11] 4,268,649
[45] May 19, 1981

[54] BINDER FOR CELLULOSE FIBER REINFORCED BOARD MATERIAL

[75] Inventors: Karl Jellinek, Iserlohn-Letmathe; Rolf Müller, Duisburg, both of Fed. Rep. of Germany

[73] Assignee: Rütgerswerke Aktiengesellschaft, Frankfurt am Main, Fed. Rep. of Germany

[21] Appl. No.: 43,565

[22] Filed: May 29, 1979

Related U.S. Application Data

[62] Division of Ser. No. 890,894, Mar. 28, 1978.

[30] Foreign Application Priority Data

Apr. 16, 1977 [DE] Fed. Rep. of Germany ....... 2716971

[51] Int. Cl.$^2$ .................... C08G 18/54; C08L 61/10; B32B 27/40
[52] U.S. Cl. .................................. 525/504; 156/335; 428/425.1; 528/54; 528/56; 528/85
[58] Field of Search ............... 525/504; 260/DIG. 40; 528/85, 67

[56] References Cited

U.S. PATENT DOCUMENTS

| | | | |
|---|---|---|---|
| 3,043,794 | 7/1962 | Feiler et al. | 428/423 |
| 3,632,531 | 1/1972 | Rush et al. | 525/504 |
| 3,676,392 | 7/1972 | Robins | 260/DIG. 40 |
| 3,707,178 | 12/1972 | Miller et al. | 156/335 |
| 4,051,092 | 9/1977 | Holik et al. | 260/DIG. 40 |
| 4,079,031 | 3/1978 | Sardessai et al. | 528/85 |

FOREIGN PATENT DOCUMENTS

| | | | |
|---|---|---|---|
| 2280300 | 2/1976 | France | 428/528 |
| 414096 | 8/1974 | U.S.S.R. | 428/528 |

Primary Examiner—H. S. Cockeram
Attorney, Agent, or Firm—Beveridge, DeGrandi, Kline & Lunsford

[57] ABSTRACT

A binder for cellulose fiber reinforced board material comprising a mixture of:
(a) a weakly alkaline phenol-formaldehyde condensate resin with a phenolic compound to formaldehyde mol ratio of 1:1.5 to 1:3.0, preferably of 1:1.8 to 1:2.7, and with an alkali content of $\leq 15\%$ by weight NaOH or KOH, related to the solids content of the resin;
(b) a di- and/or poly-functional isocyanate in a quantity of from 5% to 25% by weight, related to (a); and
(c) a tertiary alkyl and/or aralkyl amine and/or alkylene polyamine in a quantity of from 0.1% to 5% by weight, related to (a), a boiling water and weather resistant board material containing said binder and a process for the production of said board material.

3 Claims, No Drawings

BINDER FOR CELLULOSE FIBER REINFORCED BOARD MATERIAL

This is a division of copending application Ser. No. 890,894, filed Mar. 28, 1978.

BACKGROUND OF THE INVENTION

1. Field of the Invention

The present invention relates to cellulose fiber reinforced board material that is resistant to boiling water and to weather, to a binder mixture for use in said board material and to a process for production of said board material.

2. Description of the Prior Art

The production of board material resistant to boiling water and weather (e.g., chip boards of the quality V 100 according to DIN 68763) made of cellulose fiber-containing natural products such as wood fibers, wood chips, wood veneer, bagasse, rice hulls, flax shives, saw dust and other waste products of wood processing and covered with a synthetic resin binder while using pressure and heat constitutes the general status of the prior art. In the past, an alkali-containing phenol formaldehyde condensate in aqueous solution, or a di- or polyisocyanate were proposed as binders for this purpose. Urea and melamine resins are largely eliminated for this purpose of application because of their lack of resistance to hydrolysis. However, even the binders previously known and used for weather resistant cellulose fiber reinforced boards, used generally and preferably in the open air for construction and building purposes, have a number of disadvantages from the viewpoint of their practical applications which shall be described briefly hereinbelow.

In the case of the strongly alkaline phenol resins still used almost exclusively for this purpose, one result is a relatively high water absorption and a consequent swelling in thickness of boards produced therewith. Moreover, and because of the high alkali content necessary for reasons of hardening techniques, there have resulted disturbing efflorescence as well as the emergence of brownish colored liquid components which above all also make the subsequent production of decorations on the surfaces of the board very difficult. Both in the case of covering with a layer of decorative plastic film as well as in the case of lacquering and above all in a moist atmosphere, brownish discolorations, deepening of colors or general changes of the color tone of these decorative surface layers occur frequently.

With regard to the status of the prior art, the present inventors refer also to the statements by K. Ernst, Holz-Zentralblatt, No. 122, Oct. 10, 1976, page 1585:

"Despite their resistance against moisture, boards covered with phenol resin binders show deficiencies in several modes of application. They are based essentially on the hygroscopic salt content of the phenol resin. In the case of these salts, we are dealing with sodium hydroxide (NaOH) and potassium carbonate ($K_2CO_3$). While sodium hydroxide is essential for the production of water soluble phenol resols, the potassium carbonate is used as a hardening accelerator in order to increase the profitability of the production of chip boards. As a result of the presence of salts in the phenol resin-V-100-boards, said chip boards, in the case of the action of humid air, obtain a moisture content which is clearly above the values of solid wood. In the case of a longer lasting action of a relative humidity above 90%, even a secretion of water in the chip boards may occur."

The lowering of the alkali content for the purpose of improvement of the deficiencies explained above, which are the result of the presence of high alkali concentrations, has up to the present time encountered insurmountable technical difficulties since the alkali also functions as the accelerator for the heat cure hardening of the binder. In the case of lowering the alkali content to values of $\leq 15\%$ by weight solid alkali in the dry binder, the hardening speeds of the phenol resin binders have fallen so greatly that a profitable processing within predetermined pressing cycles has proven to be impossible in practice, especially when interior layers of the board are to be produced with this binder. A satisfactory solution of these technical problems which occur in use of phenol resins as a binder has therefore not yet been achieved.

When using di- and polyisocyanates as binders, it is true that the difficulties discussed above in connection with phenol resin binders do not occur. Weather resistant cellulose fiber reinforced boards are produced which have a low moisture absorption, a favorable swelling behavior and good mechanical characteristics which remain intact even under continued influences of weather conditions. However, the extremely strong adhesion of the isocyanate binders to the surfaces of the compressed boards has proven to be disadvantageous and an impediment for a broad application as a binder, which hitherto has prevented the use of these binders in the cover layers. The use of the isocyanates has therefore occurred, in the few cases which have become known, exclusively as a binder for inside layers, while the cover layers because of the essentially better separating effect, were covered with a phenol resin glue or binder. (See H. J. Sachs, "Isocyanates as Binders for Chip Boards", Holz-Zentralblatt, No. 20, Feb. 16, 1977, pages 295 and 296). The use of special separating agents on the pressure plates suggested for prevention of the adhesion of isocyanates in the cover layer can be accomplished only with great difficulty or at high additional cost as an additional operating step in the mostly fully automated installations for the production of chip boards, for reasons of process engineering.

A further disadvantage of the isocyanate binders is caused by the essentially higher price which very clearly surpasses that of phenol resins. The higher price is not compensated by the somewhat lower requirement of binder, the somewhat higher speed of hardening and thus shorter manufacturing time of the boards, or by the fact that the fibrous cellulose material used need be less completely dried prior to processing than when using the phenol resins as a binder.

It is therefore a primary object of the present invention to provide a boiling water and weather resistant cellulose fiber reinforced board and process for the production thereof which avoid and overcome the disadvantages of the prior art boards and processes discussed above.

It is a further object of the present invention to provide a binder mixture for cellulose fiber reinforced board which overcomes the drawbacks of prior art binders.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art therefrom.

SUMMARY OF THE INVENTION

It has been found that the above objects may be attained by a cellulose fiber reinforced board which contains as a binder a mixture of:

(a) a weakly alkaline phenol-formaldehyde condensate resin with a phenolic compound to formaldehyde mol ratio of 1:1.5 to 1:3.0, preferably of 1:1.8 to 1:2.7, and with an alkali content of $\leq 15\%$ by weight NaOH or KOH, related to the solids content of the resin;

(b) a di- and/or poly-functional isocyanate in a quantity of from 5% to 25% by weight, related to (a); and (c) a tertiary alkyl and/or aralkyl amine and/or alkylene polyamine in a quantity of from 0.1% to 5% by weight, related to (a).

Fiber or chip-shaped reinforcing materials covered with this binder mixture result surprisingly in boiling water and weather resistant boards with essentially lower moisture absorption behavior, lower thickness swelling and excellent mechanical characteristics with the use of customary binder contents of 8–15% by weight, based on the dry weight of the fiber material used, in equally short pressing cycles, as known when using the strongly alkaline phenol resin binders. A subsequent occurrence of surface disturbances—such as efflorescences or the emergence of brownish strongly colored liquid components—no longer occurs in boards bound with a binder mixture according to the present invention so that decorative surface layers of thermoplastic or duroplastic surface films or by the application of lacquer, may be successfully used. The total picture of the characteristics of these fiber reinforced boards is practically equal to that of board materials produced with the exclusive use of isocyanates.

The synergetic effect of the binder mixture according to the present invention could not have been foreseen in any way, since phenol resins poor in alkali, with alkali contents of $\leq 15\%$ by weight, have been considered by those skilled in the art as largely unsuitable for the production of chip boards because of their required exceedingly long hardening times (low hardening speed). The use of isocyanates in the cover layers of weather resistant chip boards, because of the strong adhesion of these binders to metallic pressure plates, hitherto has proven to be technically impractical so that an economically expensive multilayer construction of boards was necessary with regard to this binder. In this case, the practical procedure was such that the cover layers were formed of chips which were covered only with a pure phenol resin binder while the strongly adhesive isocyanates were used exclusively as binders for chips of the inside layer. The discovered surprising synergism of the binder mixture according to the present invention solves difficulties in processing techniques as described in a simple and particularly economically favorable manner. The binder mixture may be used as the sole binder both for the covering and intermediate layers and it makes in this manner the technically difficult and, from a cost point of view, expensive multilayer binder construction superfluous.

Moreover, it is surprising that the isocyanate used within the framework of the mixture claimed herein with phenol resins poor in alkali and with tertiary amine accelerators, shows no adhesion whatever on metallic pressure plates. This effect, in view of the exceedingly strong adhesion of unmodified isocyanates of the binder in the cover layer of weather resistant chip boards could not be foreseen under any circumstances.

The high economic significance of the present invention becomes particularly clear as a result of the fact that the same favorable mechanical characteristics as well as equally desirable behavior against the effect of water and high relative humidity may be achieved as are accomplished with pure, unmodified isocyanates, with a binder which consists of a maximum of only about 1/5 of the expensive isocyanate and roughly 4/5 of a phenol formaldehyde concentrate having a more favorable price. The economic advantage of the binder mixture according to the present invention which can easily be understood after analyzing the values, becomes clear from a comparison in the table below following the specific examples.

DESCRIPTION OF THE PREFERRED EMBODIMENTS

The phenol resins poor in alkali (with a low alkali content), the production of which is not claimed herein, are obtained by conversion of phenol or cresol with aqueous formaldehyde solution in the presence of a caustic soda solution or potassium hydroxide solution as catalyst under heat until reaching a predetermined degree of condensation. The added quantity of catalyst, according to the definition thereof, is limited to $\leq 15\%$ by weight of solid alkali in the dry resin. The mol ratio of phenolic compounds to formaldehyde amounts to 1:1.5 to 1:3.0, preferably 1:1.8 to 1:2.7.

The well known isocyanate compounds obtainable on the market such as toluylene diisocyanate, 4,4'-diisocyanato-diphenyl methane, hexamethylene diisocyanate, triisocyanato-triphenyl methane, diisocyanato-isophoron, etc, for a review of suitable isocyanates see "Polyurethane, Vieweg/Hoechtlen, Carl Hansen Verlag, Muenchen 1966, page 91–93" as well as higher functional polyisocyanates of the formula:

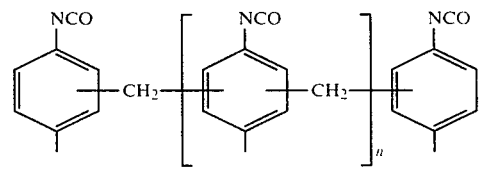

whereby n may equal an integer from 1 to 10, are used as the isocyanate singly or in admixture. For toxicological reasons, 4,4'-diisocyanato-diphenyl methane and/or the higher functional multinuclear isocyanates of the above formula are preferred.

Suitable tertiary amines include alkyl and/or aralkyl and/or alkylene substituted amines and polyamines such as, for example, trimethylamine, triethylamine, triisopropyl amine, dimethyl-butyl-amine, tris-(dimethylaminomethyl)-phenol, hexamethylene tetramine, N,N'-tetramethyl ethylene diamine, benzyl-dimethyl-amine, triethanolamine and others.

Certain of these tertiary amines will correspond to the formula:

$R_3N$ wherein R is alkyl containing from 1 to 10 carbon atoms, unsubstituted or substituted by, e.g., hydroxyl, chlorine- or carboxylic groups, or aryl containing from 6 to 10 carbon atoms, unsubstituted or substituted by, e.g., hydroxyl-, chlorine- or carboxylic groups, at least one R being alkyl. In general, however, the term "tertiary amine" or "tertiary amine accelerator" as used herein refers to any amine polyamine or amino nitrogen-containing compound wherein all three of the amino hydrogen atoms are replaced by said alkyl alkylene or aryl or wherein the amino nitrogen atoms thereof is connected through all three valences to said alkyl, alkylene or aryl.

As reinforcing material for the production of cellulose fiber reinforced boards with the use of the claimed binder mixtures, fibers or veneers of soft and hard wood may be used. The woods used comprise spruce, pine, poplar, beech, oak, alder and other coniferous and deciduous woods. Basically, other laminar and fibrous natural products such as bagasse, flax shives, rice hulls, etc., may be used alone or in combination with wood chips or fibers as raw material for cellulose reinforced boards in accordance with the present invention.

The quantity of binder used customarily amounts to from 8% to 15%, preferably from 9% to 11% by weight, based on the weight of the dry fiber mass, without being an essential limitation of the quantity of binder to be fixed thereby. Naturally, however, and for economic reasons, the content of binder is practically limited in the direction of higher resin content.

The covering of the chips or other fiber mass with resin is accomplished in mechanical mixing arrangements suitable for that purpose, whereby the three components of the binder mixture according to the present invention may be added either in a premixed form or separate from one another into the mixture. In connection with this there follows the formation of a pressable resin impregnated fiber mass with the help of spreading machines suitable for this purpose. The pressing into finished chip boards or fiber boards is then accomplished between pressure plates in single or multi-layered hot presses at temperatures between 150° and 250° C., preferably 170° to 220° C., at a pressure of from about 20 to 30 kg/cm$^2$ with or without spacing strips.

The following examples are presented to explain the present invention in more detail without limiting its scope thereby. Unless otherwise indicated, all parts and percentages are by weight.

EXAMPLE 1

A 3-layer wood chip board was produced in the following manner:

2575 Grams of core chips (industrial chips containing about 60% pine wood, 20% beech wood and 20% other soft or hard wood types) with a moisture content of about 3% were jet sprayed uniformly in a Drais laboratory mixer with a binder mixture consisting of 420 g. of an aqueous phenol resin which had a dry solids content of 45% and a content of 12% of a solid caustic soda lye in the dry solids, 4 g. of hexamethylene tetramine and 34 g. of 4,4'-diisocyanato-diphenylmethane and subsequently with 60 g. of a 50% aqueous paraffin emulsion, whereby the overall duration of the process of covering with binder amount to 10 minutes. In the same manner, 1802 g. of face chips (industrial chips of spruce and pine wood) with a 6% moisture content were jet sprayed with a mixture of 343 g. of the above phenol resin, 3.5 g. of hexamethylenetetramine and 28.5 g. of 4,4'-diisocyanato-diphenylmethane as well as subsequently with 40 g. of a 50% aqueous paraffin emulsion. The binder covered chip material was then spread in the customary manner into a 3-layer chip cake (cover layers each 20%, core layer 60%) and were pressed into chip boards in a hot press between pressure plates of steel. The pressing conditions were as follows:

Board measurements—55×55×2 cm
Rough thickness—20 mm
Theoretical oven dry density—650 kg/m$^3$
Locking pressure—20 kg/cm$^2$
Closing time—90 sec.
Pressure plate temperature—170° C.
Overall pressing time—6 min. The board was examined after a conditioning time period of 8 days at 20° C. and 65% relative humidity. The results of the examination are seen in the following table. The phenol resin poor in alkali used in this example was produced at 20° C. from 94 parts by weight (1 mol) of phenol, 178 parts by weight (2.2 moles) of formaldehyde in 37% aqueous solution and 72 parts by weight of caustic soda solution (25%) by joint condensation at 80° C. up to a viscosity of 300 cP.

EXAMPLE 2

A 3-layer wooden chip board was produced in the manner described in Example 1 with the exception that the following binders were used:

(a) covering of the core chips was with a binder mixture consiting of 390 g. of the phenol resin according to Example 1, 1 g. of triethylamine and 50 g. of polymethylene-polyphenylisocyanate, (commercial designation PAPI of the firm Upjohn Polymer NV, Netherlands); and (b) covering of the face chips was with a binder mixture of 323 g. of the above-described phenol resin, 0.85 g. of triethylamine and 42 g. of polymethylene polyphenylisocyanate. During pressing, the oven dry density was adjusted to 700 kg/m$^3$.

EXAMPLE 3

A 3-layer wood chip board was produced in the same manner as described in Example 1, with the exception that the following binders were used.

(a) covering of the core chips was with a binder mixture of 454 g. of the phenol resin according to Example 1, 0.2 g. of tris-(dimethylamino-methyl)-phenol and 20 g. of 4,4'-diisocyanatodiphenylmethane; and (b) covering of the face chips was with a binder mixture of 392 g. of the phenol resin of Example 1, 0.2 g. of triethanolamine and 19 g. of 4,4'-diisocyanato-diphenylmethane.

During pressing, the oven dry density was adjusted to 700 kg/m$^3$.

EXAMPLE 4

Example 3 was repeated with the exception that the added quantities of tris-(dimethylamino-methyl)-phenol and of triethanolamine were lowered to 0.1 g. in each case.

COMPARATIVE EXAMPLES

Boards with the following binders were produced for comparison with the chip boards produced in the manner according to the invention.

COMPARATIVE EXAMPLE 1

(Only isocyanate as binder)

In the procedure of Example 1, the core chips were covered with 200 g. of 4.4'-diisocyanato-diphenylmethane and the face chips with 170 g. of the same binder. The pressure plates were protected by paper against adhesion of the chip board.

COMPARATIVE EXAMPLE 2

(Only phenol resins poor in alkali as binder)

In the procedure of Example 1, core chips were covered with 500 g. and the face chips with 430 g. of the same phenol resin poor in alkali used in Example 1. After pressing the chips under the conditions stated in Example 1, the board did not hold together, but split in the core layer.

COMPARATIVE EXAMPLE 3

(Phenol resin-isocyanate combination without tertiary amine)

A chip board with the binder used in Examples 3 and 4 but with a complete omission of tris-(dimethylaminomethyl)-phenol and triethanolamine was produced. The characteristic values of these boards were clearly inferior to those of the boards produced according to the invention as seen in the following table.

In all of the three comparative examples, the procedure was as described for Example 1, and the oven dry density of the boards was adjusted as in the boards of Examples 2-4 to 700 kg/m$^3$.

TABLE

|  | Example No. 1 | Example No. 2 | Example No. 3 | Example No. 4 | Comparative Example No. 1 (Isocyanate) | Comparative Example No. 2 (Phenol resin poor in alkali) | Comparative Example No. 3 (Phenol resin + isocyanate) |
|---|---|---|---|---|---|---|---|
| Oven dry density (kg/m$^3$) | 656 | 710 | 713 | 707 | 694 | Board does not stick together | 692 |
| Thickness of boards (mm) | 20.2 | 20.6 | 19.8 | 20.2 | 19.4 | | 20.7 |
| Bending resistance (kg/cm$^2$) | 210 | 216 | 241 | 227 | 224 | | 218 |
| Transverse stress resistance (kg/cm$^2$) | | | | | | | |
| (a) dry | 6.8 | 5.5 | 7.1 | 5.0 | 6.8 | | 4.9 |
| (b) after 2 hours storage in boiling water (test V 100) | 3.4 | 2.5 | 3.7 | 2.7 | 3.7 | | 1.7 |
| Thickness swelling (%) | | | | | | | |
| (a) 24 hours in water of 20° C. | 10.5 | 7.9 | 10.7 | 11.4 | 9.0 | | 11.2 |
| (b) 1 hour in water of 100° C. | 14.6 | 14.1 | 14.3 | 14.6 | 14.0 | | 19.8 |

What is claimed is:

1. A binder for cellulose fiber reinforced board material comprising a mixture of:
    (a) a weakly alkaline phenol formaldehyde condensate resin with a phenolic compound to formaldehyde mol ratio of from 1:1.5 to 1:3.0, and with an alkali content of $\leq 15\%$ by weight NaOH or KOH, related to the solids content of the resin;
    (b) a difunctional isocyanate, poly-functional isocyanate or mixture thereof in a quantity of from 5% to 25% by weight, related to the resin (a); and
    (c) a tertiary alkyl amine, aralkyl amine alkylene polyamine or mixture thereof in a quantity of from 0.1% to 5% by weight, related to the resin (a).

2. The binder according to claim 1 wherein the phenolic compound to formaldehyde mol ratio of resin (a) is from 1:1.8 to 1:2.7.

3. The binder according to claim 1 containing as isocyanate 4,4'-diisocyanato-diphenylmethane, a compound of the formula:

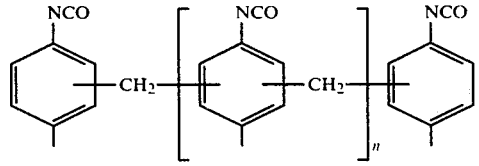

whereby n is an integer from 1 to 10, or a mixture thereof.

* * * * *